US009256203B2

(12) United States Patent
Choi et al.

(10) Patent No.: US 9,256,203 B2
(45) Date of Patent: *Feb. 9, 2016

(54) SURFACE LIGHT SOURCE DEVICE FOR RECORDING/REPRODUCING HOLOGRAMS

(71) Applicant: Samsung Electronics Co., Ltd., Suwon-si (KR)

(72) Inventors: Kyu-hwan Choi, Yongin-si (KR); Hong-seok Lee, Seongnam-si (KR); Hoon Song, Yongin-si (KR); Yoon-sun Choi, Yongin-si (KR); Jung-mok Bae, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/494,116

(22) Filed: Sep. 23, 2014

(65) Prior Publication Data
US 2015/0009684 A1    Jan. 8, 2015

Related U.S. Application Data

(63) Continuation of application No. 13/217,420, filed on Aug. 25, 2011, now Pat. No. 8,879,154.

(30) Foreign Application Priority Data

Oct. 22, 2010  (KR) ........................ 10-2010-0103684

(51) Int. Cl.
G02B 27/14    (2006.01)
G02B 27/10    (2006.01)
G03H 1/04    (2006.01)
G02B 27/09    (2006.01)
(Continued)

(52) U.S. Cl.
CPC ........ *G03H 1/04* (2013.01); *F21V 13/00* (2013.01); *G02B 27/0905* (2013.01); *G02B 27/0933* (2013.01); *G02B 27/0961* (2013.01); *G02B 27/0977* (2013.01); *G03H 1/02* (2013.01); *G03H 1/2286* (2013.01); *G03H 2001/0212* (2013.01); *G03H 2222/22* (2013.01); *G03H 2222/35* (2013.01)

(58) Field of Classification Search
CPC .. G02B 27/145; G02B 3/0056; G02B 27/144; G02B 27/0172
USPC .................................. 359/619–621, 629–630
See application file for complete search history.

(56) References Cited

U.S. PATENT DOCUMENTS

| 4,461,541 A | 7/1984 | Duthie |
| 5,751,682 A | 5/1998 | Hasegawa |

(Continued)

FOREIGN PATENT DOCUMENTS

| JP | 5-268556 A | 10/1993 |
| JP | 10-32147 A | 11/1998 |

(Continued)

*Primary Examiner* — Dawayne A Pinkney
(74) *Attorney, Agent, or Firm* — NSIP Law (57) ABSTRACT

A surface light source device is provided. The surface light source device includes a light source, a beam splitter configured to split a light irradiated from the light source into a plurality of light beams each having a different path, a diffusion unit configured to diffuse the plurality of light beams split by the beam splitter into a surface light, and a collimating unit configured to arrange the plurality of light beams diffused from the diffusion unit in one direction.

8 Claims, 6 Drawing Sheets

(51) Int. Cl.
*G03H 1/02* (2006.01)
*G03H 1/22* (2006.01)
*F21V 13/00* (2006.01)

(56) References Cited

U.S. PATENT DOCUMENTS 6,577,429 B1 6/2003 Kurtz et al.
7,446,733 B1 11/2008 Hirimai 2005/0174649 A1* 8/2005 Okada et al. .................. 359/619
2005/0254127 A1 11/2005 Evans et al.
2006/0263171 A1 11/2006 Schwarz
2007/0091600 A1 4/2007 Lerner et al.
2007/0171376 A1 7/2007 Wang et al.

FOREIGN PATENT DOCUMENTS

JP 2002-328335 A 11/2002
KR 10-0609379 B1 8/2006

* cited by examiner

SURFACE LIGHT SOURCE DEVICE FOR RECORDING/REPRODUCING HOLOGRAMS

CROSS-REFERENCE TO RELATED APPLICATION

This application is a continuation application of U.S. application Ser. No. 13/217,420, filed Aug. 25, 2011, which claims the benefit under 35 U.S.C. §119(a) of Korean Patent Application No. 10-2010-0103684, filed on Oct. 22, 2010, in the Korean Intellectual Property Office, the entire disclosures of which are incorporated herein by reference.

BACKGROUND

1. Field

The following description relates to a surface light source device for recording and reproducing holograms.

2. Description of the Related Art

Multi-dimensional image display devices, such as 3-dimensional (3D) image display devices, realistically and effectively display 3D images and are increasingly used in fields, such as medical imaging, games, advertising, education, military applications, etc. Accordingly, holography methods and stereoscopy methods have been actively researched.

In a holography method, overlapping a light incident from an object with a coherent reference light is recorded and reproduced in order to obtain a coherent signal. The holography method is an suitable method for realizing a multi-dimensional image, such as a 3D image. Since Dennis Gabor, an English scientist, developed the first hologram in the 1940s, many scientists have conducted research into holography. More recently, a variety of techniques for displaying holograms have been developed including, for example, a pulse laser hologram for a dynamic image, a stereohologram for a wide spatial view and wide viewing angle, an embossed hologram for mass production, a natural color hologram for displaying natural colors, a digital hologram using a digital imaging device, and an electronic holography for displaying an electronic hologram.

Surface light source devices for recording/reproducing a hologram as a 3D image are used in displaying a holographic image. In response to a hologram being optically recorded, a surface light source device that provides a coherent surface light is used to form interference fringes of an object beam and a reference beam. Also, a surface light source device is used for irradiating a surface light as a reproducing light to a medium onto which a hologram is recorded, and the surface light source device is used to display a 3D image. In addition, in response to a hologram being electrically recorded, a surface light source device is used to reproduce a hologram.

SUMMARY

According to an aspect, a surface light source device is provided. The surface light source device including a light source, a beam splitter configured to split a light irradiated from the light source into a plurality of light beams each having a different path, a diffusion unit configured to diffuse the plurality of light beams split by the beam splitter into a surface light, and a collimating unit configured to arrange the plurality of light beams diffused from the diffusion unit in one direction.

The diffusion unit may include a plurality of pin holes respectively corresponding to the plurality of light beams.

The collimating unit may include a lens array including a plurality of convex lens units.

The plurality of convex lens units may be formed to respectively correspond to the plurality of pin holes.

The plurality of convex lens units may have sizes respectively corresponding to a cross-section of the plurality of light beams diffused while passing through the plurality of pin holes.

The device may further include an optical mask configured to change a beam intensity distribution of a beam collimated by the collimating unit, at a cross-section of the beam.

The optical mask may have a non-uniform light transmittance distribution, and the light transmittance distribution may be determined so that a relatively low light transmittance occurs in an area that corresponds to an area where beam intensity is relatively high in comparison to other areas.

The beam splitter may include a plurality of cubic beam splitters.

The beam splitter may include an light splitting member configured to split a light irradiated from the light source into a plurality of light beams each proceeding in a different direction, and a reflective member having reflective surfaces reflecting the plurality of light beams in directions parallel to each other. The plurality of light beams may be respectively incident on the reflective member at a different incident angle.

The diffusion unit may include a plurality of pin holes respectively corresponding to the plurality of light beams.

The collimating unit may include a lens array including a plurality of convex lens units.

The plurality of convex lens units may be formed to respectively correspond to the plurality of pin holes.

The plurality of convex lens units may have sizes respectively corresponding to a cross-section of the plurality of light beams diffused while passing through the plurality of pin holes.

The light splitting member may include a rotating polygon mirror having a plurality of mirror surfaces.

The light source may irradiate light so as to scan the mirror surfaces during a predetermined period along a rotating axis direction of the rotating polygon mirror.

The light splitting member may include a galvanometer mirror.

The reflective surface may include a plurality of flat reflective surfaces each having a different tilt angle.

The number of the plurality of flat reflective surfaces may correspond to the number of the plurality of light beams split by the light splitting member.

A device for recording/reproducing holograms may use the surface light source device as a recording light or reproducing light.

In another aspect, a device is provided. The device includes a surface light source unit including a beam splitter configured to split a light irradiated from a light source into a plurality of light beams each having a different path, a diffusion unit configured to diffuse the plurality of light beams split by the beam splitter into a surface light, and a collimating unit configured to collimate the diffused plurality of light beams.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
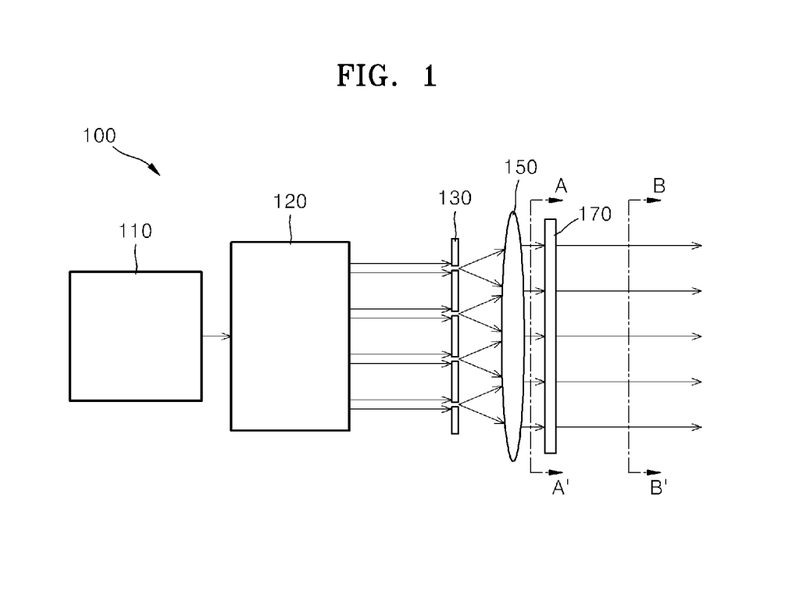
FIG. 1 is a diagram illustrating an example of a surface light source device.
Figure 2:
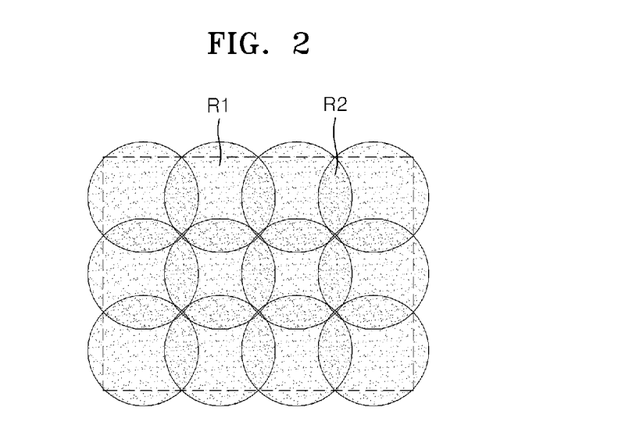
FIG. 2 is a diagram illustrating a distribution of an optical beam seen from a cross-section cut along a line of A-A' of FIG. 1.
Figure 3:
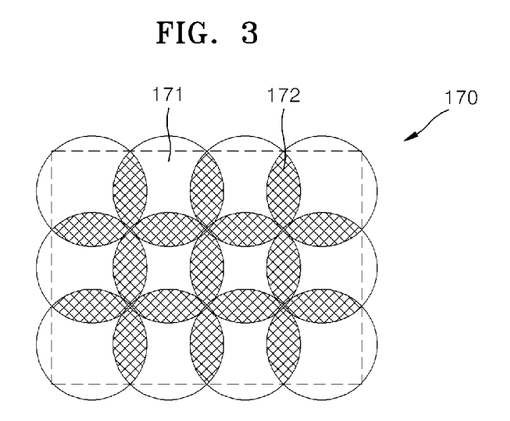
FIG. 3 is a diagram illustrating variations of a light transmission of an optical mask of FIG. 1 with positions in the optical mask 170.
Figure 4:
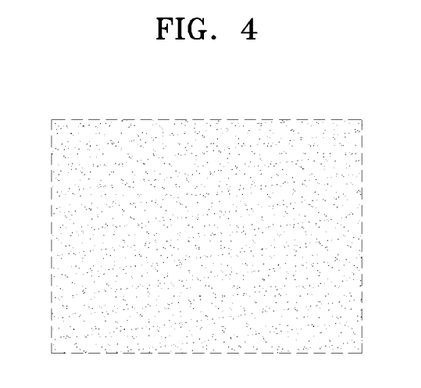
FIG. 4 is a diagram illustrating a distribution of a light beam seen from a cross-section cut along a line of B-B' of FIG. 1.

FIG. 1 illustrates an example of a surface light source device 100, FIG. 2 illustrates a distribution of an light beam seen from a cross-section cut along a line of A-A' of FIG. 1; FIG. 3 illustrates variations of a light transmission of an optical mask 170 of FIG. 1 according to positions in the optical mask 170, and FIG. 4 illustrates a distribution of an light beam seen from a cross-section cut along a line of B-B' of FIG. 1.

Referring to FIG. 1, the surface light source device 100 includes an light source 110, a beam splitter 120 for splitting a beam generated by the light source 110, a diffusion unit 130 for diffusing the split beam, and a collimating unit for arranging the beam diffused from the diffusion unit 130.

A coherent laser light source may be used as the light source 110. Also, the light source 110 may be configured to irradiate a light having a wavelength in a blue or an i-line band as a light having a short wavelength so as to produce an increased resolution when a hologram is recorded in comparison to a hologram produced with a light having a longer wavelength.

The beam splitter 120 is used to split a light irradiated from the light source 110 into plurality of light beams each having a different path. The beam splitter 120 may include, for example, a plurality of cubic beam splitters. A number of the split light beams corresponds to a number of the cubic beam splitters, and the plurality of cubic beam splitters may be disposed in one-dimensional or two-dimensional arrays.

The diffusion unit 130 diffuses light beams so that a surface light is constituted by the plurality of light beams split in the beam splitter 120. In this regard, the diffusion unit 130 may include a plurality of pin holes h respectively corresponding to the plurality of light beams split in the beam splitter 120.

The collimating unit arranges the light beams diffused from the diffusion unit 130 as a surface light in one direction and may include a collimating lens 150 to collimate the light beams.

Also, the surface light source device 100 may also include the optical mask 170 which changes a beam intensity distribution of a beam collimated by the collimating lens 150, at a cross section of the beam. In response to the collimated beam intensity distribution of a beam not being uniform, the optical mask 170 is used to change the beam intensity distribution to be uniform. For example, in response to the light beams being diffused from the diffusion unit 130 and constituting a surface light, an intensity of beam may be greater in an area where the beams overlap than an intensity of beam in an area where the beams do not overlap. FIG. 2 illustrates a distribution of the light beams. Referring to FIG. 2, an intensity of beams in areas R2 where the beams overlap is greater than that in areas R1 where the beams do not overlap. Due to the non-uniform distribution of light intensities of the beams, the optical mask 170 may have a non-uniform light transmittance distribution so as to offset intensity differences of the beams. As illustrated in FIG. 4, a light transmittance of the optical mask 170 may vary according to positions in the optical mask 170. In consideration of the beam distribution, a light transmission distribution may be determined in such a way that a relatively low light transmittance occurs in areas that correspond to areas where an intensity of beam is relatively high in comparison to other areas. As illustrated in FIG. 3, the optical mask 170 includes first areas 171 corresponding to areas R1 where an intensity of beams is relative low and second areas 172 corresponding to areas R2 where an intensity of beams is relatively high. The optical mask 170 may offset a difference in the intensity of beams of the areas R1 and R2, and a light transmittance of the second areas 172 may be lower than the light transmittance of the first areas 171. The non-uniform beam distribution illustrated in the cross-section cut along the line A-A' is changed to a uniform beam distribution as illustrated in FIG. 4 due to the optical mask 170 having a light transmittance distribution that may offset the non-uniform beam distribution.

Figure 5:
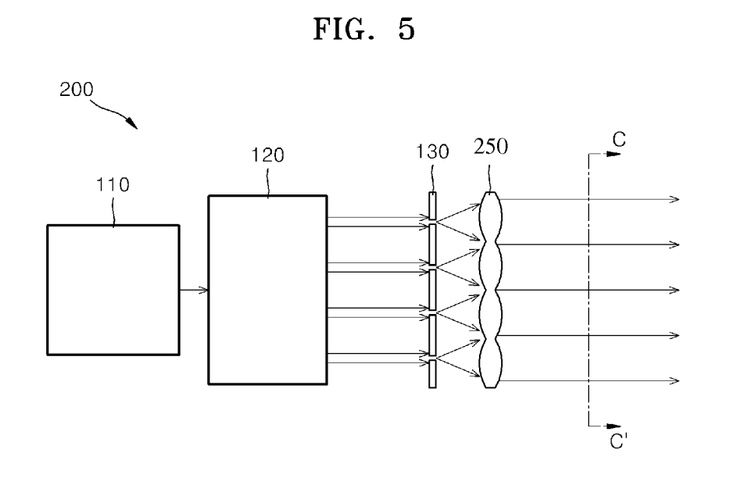
FIG. 5 is a diagram illustrating another example of a surface light source device.
Figure 6:
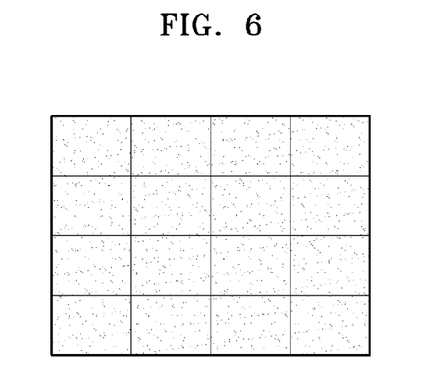
FIG. 6 is a diagram illustrating a distribution of a light beam seen from a cross-section cut along a line of C-C' of FIG. 5.

FIG. 5 illustrates another example of a surface light source device 200 and FIG. 6 illustrates a distribution of a light beam seen from a cross-section cut along a line of C-C' of FIG. 5. A collimating unit of the surface light source device 200 includes a lens array 250 according to the current example, which is the difference from the surface light source device 100 of the previous example. The lens array 250 includes a plurality of convex lens units. The plurality of convex lens units respectively corresponds to the plurality of pin holes h. The plurality of convex lens units may have sizes respectively corresponding to a cross-section of the plurality of light beams diffused while passing through the plurality of pin holes h. The lens array 250 may also include a fine-sized micro-lens array. Accordingly, areas where the diffused beams overlap are reduced in response to the beams being collimated in one direction. Accordingly, an uniform beam distribution as shown in FIG. 6 may be obtained even if the optical mask 170 of FIG. 1 is not used.

Figure 7:
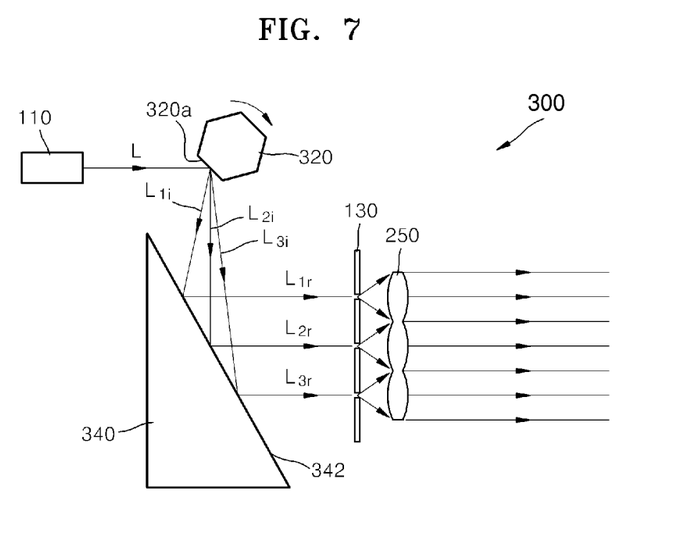
FIG. 7 is a diagram illustrating another example of a surface light source device.
Figure 8:
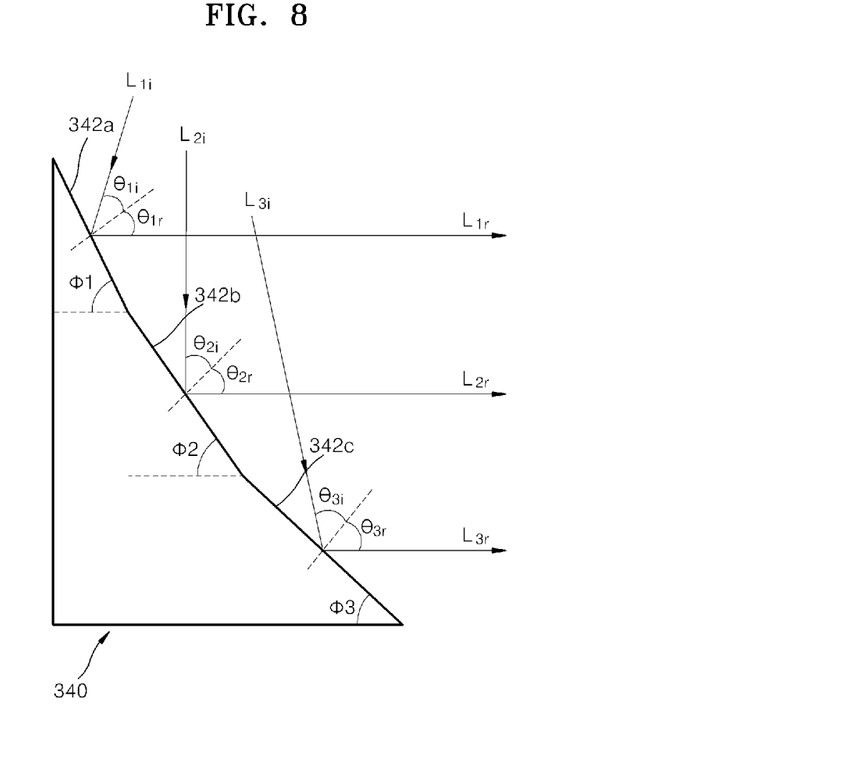
FIG. 8 is a view illustrating an example of a method of determining tilt angles of flat reflective surfaces in a reflective member used in a beam splitter of FIG. 7.
Figure 9:
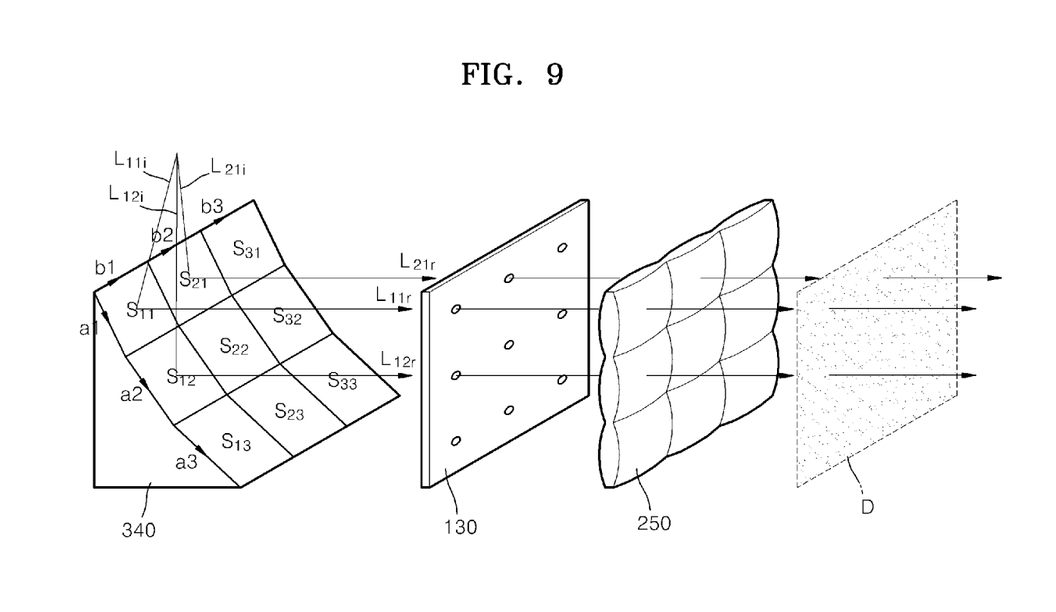
FIG. 9 is a view of the surface light source device of FIG. 7 illustrating an arrangement relationship where a plurality of flat reflective surfaces of a reflective member correspond to pin holes and a lens array.

FIG. 7 illustrates another example of a surface light source device 300, FIG. 8 is a view for illustrating an example of a method of determining each tilt angle of flat reflective surfaces $S_{11}$, $S_{12}$ ... in a reflective member 340 used in a beam splitter of FIG. 7, and FIG. 9 is a view of the surface light source device 300 of FIG. 7 illustrating an arrangement relationship where the plurality of flat reflective surfaces $S_{11}$, $S_{12}$ . . . of the reflective member 340 correspond to the pin holes h and the lens array 250.

In the current example, the beam splitter has a folded configuration so that a space for the entire system may be reduced in comparison to a beam splitter having a non-folded configuration.

Referring to FIG. 7, the surface light source device 300 includes the light source 110, a beam splitter including a light splitting member 320 and the reflective member 340, the diffusion unit 130, and the lens array 250.

The light splitting member 320 splits light L irradiated from the light source 110 into a plurality of light beams $L_{1i}$, $L_{2i}$, and $L_{3i}$ each proceeding into a different direction. The light splitting member 320 may be, for example, a rotating polygon mirror including a plurality of mirror surfaces 320a. As another example, the light splitting member 320 may be a galvanometer mirror. The reflective member 340 includes the reflective surface 342 which reflect the plurality of light beams $L_{1i}$, $L_{2i}$, and $L_{3i}$. The light beams are respectively incident at different incident angles and split by the light splitting member 320 as light beams $L_{1r}$, $L_{2r}$, and $L_{3r}$ that are parallel to each other. As illustrated in FIG. 8, the reflective surface 342 may include a plurality of flat reflective surfaces 342a, 342b, and 342c each having a different tilt angle. A number of the plurality of flat reflective surfaces 342a, 342b, and 342c correspond to the plurality of light beams $L_{1i}$, $L_{2i}$, and $L_{3i}$ split by the light splitting member 320. The tilt angles are determined in such a way that the light beams $L_{1i}$, $L_{2i}$, and $L_3$ reflected by the plurality of flat reflective surfaces 342a, 342b, and 342c are parallel to each other.

As another example, regarding the light L irradiated from the light source 110, angles of the light L reaching the mirror surfaces 320a vary according to rotation of the light splitting member 320 and thereby the light L is split into the plurality of light beams $L_{1i}$, $L_{2i}$, and $L_{3i}$ each having a different direction. The light beam $L_{1i}$ incident onto the flat reflective surface 342a at an incident angle of $\theta_{1i}$ proceeds in a predetermined direction as a light beam $L_{1r}$ reflected with a reflective angle $\theta_{1r}$. Due to Snell's reflection law, the reflective angle $\theta_{1r}$ is the same as the incident angle of $\theta_{1i}$. Similarly, the light beam $L_{2i}$ incident onto the flat reflective surface 342b at an incident angle of $\theta_{2i}$ proceeds in a predetermined direction as a light beam $L_{2r}$ reflected with a reflective angle $\theta_{2r}$. The reflective angle $\theta_{2r}$ is the same as the incident angle of $\theta_{2i}$. Also, the light beam $L_{3i}$ incident onto the flat reflective surface 342c with an incident angle of $\theta_{3i}$ proceeds in a predetermined direction as a light beam $L_{3r}$ reflected with a reflective angle $\theta_{3r}$. The reflective angle $\theta_{3r}$ is the same as the incident angle of $\theta_{3i}$. Tilt angles $\phi_1$, $\phi_2$, and $\phi_3$ of the flat reflective surfaces 342a, 342b, and 342c are determined so that the light beams $L_{1i}$, $L_{2i}$, and $L_{3i}$ are respectively reflected from the flat reflective surfaces 342a, 342b, and 342c in the same direction. In other words, $L_{1r}$, $L_{2r}$, and $L_{3r}$ are parallel to each other.

As illustrated in FIG. 9, a plurality of flat reflective surfaces $S_{11}$, $S_{12}$, $S_{13}$, $S_{21}$, $S_{22}$, $S_{23}$, $S_{31}$, $S_{32}$, and $S_{33}$ may be arranged in a two-dimensional array to correspond to the pin holes h of the diffusion unit 130.

The flat reflective surfaces ($S_{nm}$, n=1, 2, 3, m=1, 2, 3) may be formed so that the plurality of light beams $L_{nmi}$ split from the light splitting member 320 may two-dimensionally scan the reflective surface 342. For example, light incident onto the mirror surface 320a is scanned in a direction perpendicular to a rotating axis according to the rotation of the light splitting member 320. In response to a direction of light incident from the light source 110 being set to repeatedly scan the mirror surface 320a in a predetermined period along a rotating axis direction, the plurality of light beams $L_{nmi}$ split from the light splitting member 320 are respectively directed the flat reflective surfaces $S_{nm}$ each arranged in a two-dimensional array.

Directions of basis vectors $a_n$ (n=1, 2, 3, . . . ) and $b_m$ (m=1, 2, 3 . . . ) defining the flat reflective surfaces $S_{nm}$ are determined according to the principle described with reference to FIG. 8. In the drawings, $b_1$, $b_2$, and $b_3$ have the same direction for conciseness; in another example, directions of the $b_1$, $b_2$, and $b_3$ may be different from each other so that the light beams $L_{nmr}$ are reflected from the flat reflective surfaces $S_{nm}$ in the same direction. Also, based on the teachings herein, the number of the flat reflective surfaces $S_{nm}$ may be a number other than 9. In response to the number of the flat reflective surfaces $S_{nm}$ increasing, the reflective surface 342 may become more shaped like a curve.

The light beams $L_{nmr}$ reflected from the reflective member 340 face the diffusion unit 130. The diffusion unit 130 includes the plurality of pin holes h each corresponding to the light beams $L_{nmr}$. The incident light beams pass through the pin holes h and are diffused in a surface light form. After passing the diffusion unit 130, the incident light beams are incident onto the lens array 250. The lens array 250 may include the plurality of convex lens units. The plurality of convex lens units respectively corresponding to the plurality of pin holes h, and the plurality of convex lens units may have sizes respectively corresponding to a cross-section of the plurality of light beams diffused while passing through the plurality of pin holes h. The lens array 250 may also include fine-sized micro-lens array. Areas with overlapping beams are reduced when the beams diffused from the diffusion unit 130 are arranged while passing through the lens array 250, and due to a reduction in overlap, a uniform beam distribution D may be obtained. Also, an optical mask having a non-uniform light transmittance distribution may be further included according to the example illustrated in FIG. 3, in order to make the beam distribution more uniform. Also, as illustrated in FIG. 1, both the collimating lens 150 and the optical mask 170 may be used.

As described above, according to the one or more of the above examples, the surface light source device may change a coherent light into a large-sized surface light. Also, the surface light source device includes a beam splitting structure, which may have a reduced volume, and thus, the entire system may be simplified. In addition, a collimating structure, which may improve a beam uniformity of surface light, is provided so as to provide a surface light having better uniformity.

Also, the surface light source device described above may be used in recording light and/or reproducing light in a device for recording/reproducing 3D holographic images.

The surface light source device may be incorporated into various devices including, for example, a television, a cellular phone, a monitor, a tablet computer, a laptop computer etc.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A surface light source device comprising:
a light source;
a beam splitter configured to split a light irradiated from the light source into a plurality of light beams each having a different path;
a diffusion unit configured to diffuse the plurality of light beams split by the beam splitter into a surface light;
a collimating unit configured to arrange the plurality of light beams diffused from the diffusion unit in one direction; and
an optical mask configured to change a beam intensity distribution of a beam collimated by the collimating unit, at a cross-section of the beam,
wherein the optical mask has a non-uniform light transmittance distribution, and the light transmittance distribution is determined so that a relatively low light transmittance occurs in an area that corresponds to an area where beam intensity is relatively high in comparison to other areas.

2. The device of claim 1, wherein the diffusion unit comprises a plurality of pin holes respectively corresponding to the plurality of light beams.

3. The device of claim 2, wherein the collimating unit comprises a lens array comprising a plurality of convex lens units.

4. The device of claim 3, wherein the plurality of convex lens units are formed to respectively correspond to the plurality of pin holes.

5. The device of claim 4, wherein the plurality of convex lens units have sizes respectively corresponding to a cross-section of the plurality of light beams diffused while passing through the plurality of pin holes.

6. The device of claim 1, wherein the beam splitter comprises a plurality of cubic beam splitters.

7. A device for recording/reproducing holograms using the surface light source device of claim 1 as a recording light or reproducing light.

8. The device of claim 1, wherein the non-uniform light transmittance distribution is configured to modify the beam such that a uniform beam intensity distribution is generated.

* * * * *